May 3, 1949. J. H. DE FREES 2,469,158
SPRING LOADING MEANS
Filed July 19, 1944 3 Sheets-Sheet 1

INVENTOR.
JOSEPH H. DeFREES
BY Hyde and Meyer
ATTORNEYS.

May 3, 1949.  J. H. DE FREES  2,469,158
SPRING LOADING MEANS

Filed July 19, 1944   3 Sheets-Sheet 3

INVENTOR.
JOSEPH H. DeFREES
BY Hyde and Meyer
ATTORNEYS.

Patented May 3, 1949

2,469,158

UNITED STATES PATENT OFFICE 2,469,158

SPRING LOADING MEANS

Joseph H. De Frees, Warren, Pa., assignor to Pennsylvania Furnace and Iron Company, Warren, Pa., a corporation of Pennsylvania Application July 19, 1944, Serial No. 545,619

1 Claim. (Cl. 267—56)

The invention relates to spring suspensions, and more specifically to spring loading means for springs of the multiple leaf type, such as elliptic or cantilever springs.

As is well known to those skilled in the art, flexure of a leaf spring under applied loads produces changes in the straight line distance between the end points of the leaf. At least one end of such spring must therefore be capable of changing its position as the spring is flexed. One of the most familiar expedients of this type is the ordinary double pivoted shackle connection used in the elliptic or semielliptic spring suspensions of some automobiles.

Such shackle connections are quite adequate for lighter automobiles, such as pleasure vehicles, but give rise to structural and design problems as the spring loading increases, for example in trucks and heavy trailers. It has been found desirable, in one favored construction, to mount the multiple leaf spring on a single strong pivot or spring bolt at one end, leaving the other end free for limited sliding movement within a closely retaining bearing housing. It is apparent that this method of spring suspension presents its own problems. The spring end must be free to move in response to spring flexure, yet must be resiliently engaged by spring loading means adequate to prevent rattling or unintentional separation.

In one form of construction heretofore used the free end of the spring has been in reciprocable contact with a bearing block which is integral with, or otherwise affixed to a fixture, bracket, or housing attached to the vehicle frame. When this bearing block becomes unserviceable through wear, it is necessary to remove the complete bracket or housing, replacing it with a new one, although only the bearing block is worn.

One object of the present invention is to provide spring loading means for the free end of a leaf spring, said loading means comprising seating means fixed with respect to the vehicle frame, and a removable bearing block held in said seating means mainly by spring thrust.

Another object of the present invention is to provide improved means for producing a rolling or rocking type of contact between the free end of the spring and its retaining or loading means.

A further object of the invention is to provide resilient snubbing or shock absorbing means, in operative relationship with the aforesaid means for achieving a rolling type of loading contact, the result being increased freedom of spring movement, absence of vibration or rattling, and reduction of friction and wear in the movably contacting parts.

Other objects and advantages will be apparent from a study of the following specification, in conjunction with the accompanying drawings in which Fig. 1 is a fragmentary view, in side elevation, of a vehicle frame, axle, spring, and spring loading means embodying the present invention.

Figure 1:
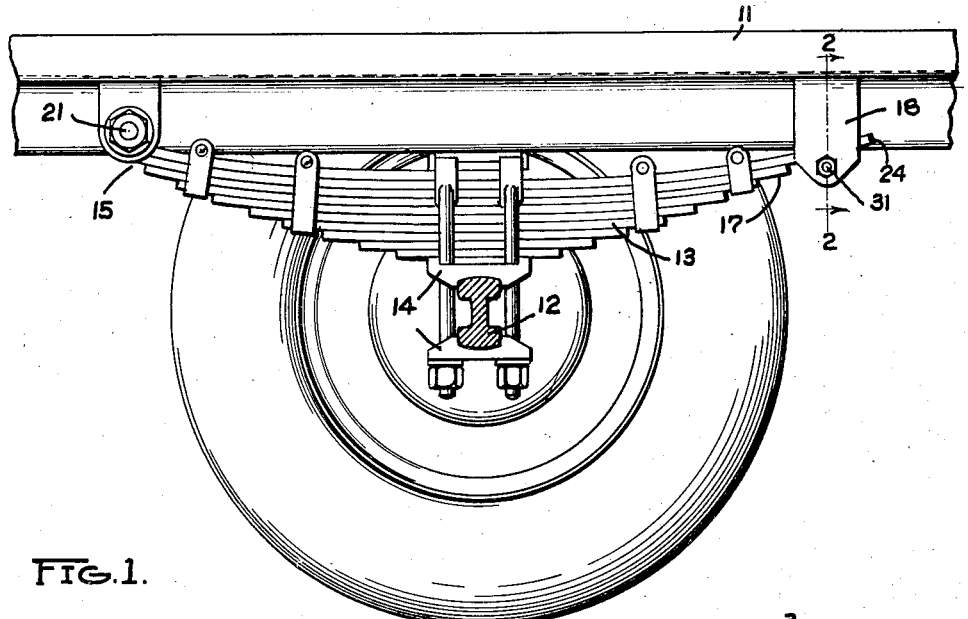

Speaking first generally, with especial reference to Fig. 1, the drawings illustrate a vehicle side frame member 11, resiliently supported on an axle 12 by means of a semielliptical multiple leaf spring 13. As here shown the mid point of the spring is attached to the axle 12 by means of a buckle 14. One end 15 of the spring (either end) is pivotally mounted with respect to the frame, and this pivotal mounting may be conventional, although I prefer to use the novel construction shown and claimed in my copending application for spring suspension, Serial No. 542,992, filed June 30, 1944, now abandoned.

The free end 17 of the semielliptical spring 13 is in supporting contact with the frame by means now to be described. With reference to Figs. 1 to 4 inclusive, a hanging bracket 18 is affixed, by welding or otherwise, to the frame 11. The bracket is of inverted U-shaped contour, being provided with base 19, and two transversely spaced depending legs 20a and 20b. As will immediately appear, the free end 17 of the spring is movably housed between the legs 20a and 20b, and underneath the base 19. The bracket therefore serves as a retaining means or seat for the spring end and for a bearing or loading block now to be described.

Since the spring, in use, is flexed between the frame and axle by the weight of the vehicle, and since one end is pivoted at 21, the other end 17 is upwardly urged against the bracket 18 or against some form of bearing therewith associated. It has heretofore been the practice to provide, within the bracket or similar housing, a loading block of bearing material fixed with respect to the frame which loading block takes the upthrust of the free spring end. For such fixed loading block I have substituted a removable loading block now to be described.

The movable loading block 23 is inserted between the top spring leaf 24 and the bracket base 19, and is gripped rather tightly by the spring tension, or upthrust of the spring end induced by the downward pressure of the vehicle. An upper wall surface 23a of block 23 is suitably curved and preferably is of cylindrical segmental contour, so as to be capable of limited rolling contact with a bearing surface of bracket base 19. In like manner, a lower wall surface 23b of block 23 is similarly contoured so as to maintain limited rolling contact with a bearing surface of spring leaf 24. This construction permits the required forward and rearward play of loading block 23, responsive to spring flexure during vehicle travel, or changes in vehicle loading.

Figures 2, 3:
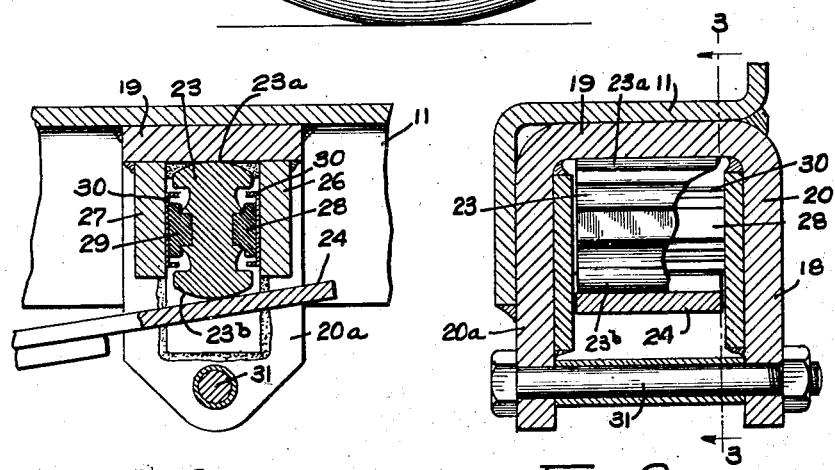
Fig. 2 is an enlarged sectional view, taken on the line 2—2 of Fig. 1.
Fig. 3 is a sectional view taken on the line 3—3 of Fig. 2.

A resilient snubbing restraint may be provided at the forward and rearward limits of travel of block 23. As best seen in Figs. 2 and 3, I have provided, within bracket 18, and between legs 20a and 20b a front abutment or stop 26 and a rear abutment or stop 27, disposed in the path of movement of block 23. While obviously such abutments may be constructed in various ways, they are here shown as metal plates depending from the base 19 of bracket 18 and integral with, or affixed thereto. The lower edges of stops 26 and 27 are high enough to permit free travel of spring leaf 24 thereunder, but are low enough to impose a limit of travel for block 23 in either direction.

Figure 4:
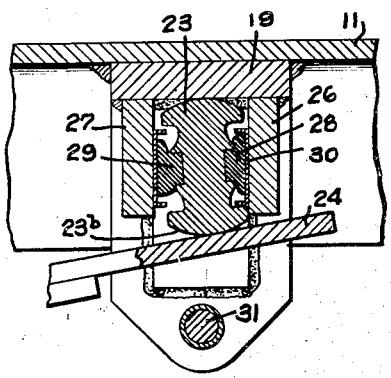
Fig. 4 is a view similar to Fig. 3, but showing the parts in a different operating position.

To provide resilient, cushioned snubbers for the block travel, I have inserted resilient shock absorbing spacers 28 and 29 between the block and stops 26 and 27 respectively. These may be made of any suitable material. For example, they may be metal springs, but they are shown as blocks of rubber or rubber-like material. Their function and operation will be apparent from the two operating positions shown in Figs. 3 and 4. In Fig. 3 the parts are shown in equilibrium, or rest condition. In Fig. 4, responsive to increased loading on the spring and consequent elongation thereof, the block 23 has been rocked endwise of the vehicle, compressing spacer 28, thereby permitting spacer 29 to expand. Release of the spring loading permits motion of the block in the opposite direction, with consequent expansion of spacer 28 and contraction of spacer 29. While these spacers or snubbers may be retained in position by being initially compressed therein, as with spiral steel springs, they may be welded or vulcanized or otherwise affixed either to the block or to the abutments, or to both. As shown in Figs. 3 and 4, snubbers 28 and 29 are carried by U-shaped channel brackets 30 affixed respectively to abutment stops 26 and 27.

It will be obvious that the spring loading device already shown and described reduces friction resulting from relative movement between spring and frame or bracket to a minimum, with practical elimination of wear, vibration or rattle. The construction is extremely sturdy, so as to be capable of supporting any weight encountered in service, or any normal road shocks.

When loading block 23 becomes sufficiently worn to render its replacement desirable, the frame 11 may be jacked up to take the load off the leaf spring, which drops into contact with a bolt 31 spanning the space between legs 20a and 20b of the bracket 18. On removal of bolt 31 the block 23 has sufficient clearance to be withdrawn from its seat in the bracket, and a new block may be substituted.

Figure 5:
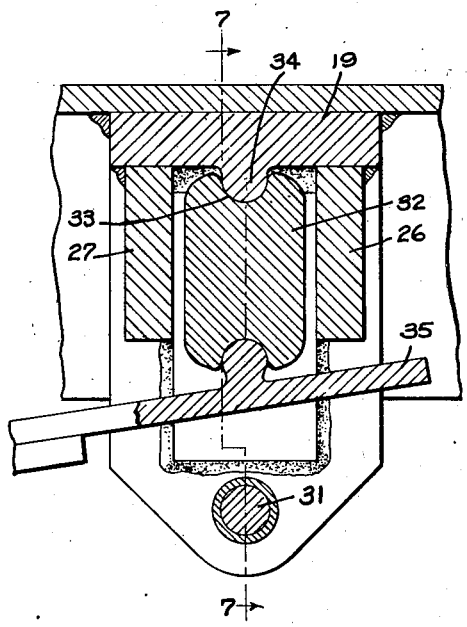
Fig. 5 is a vertical sectional view similar to Fig. 3, but showing a somewhat modified embodiment of the invention.
Figure 6:
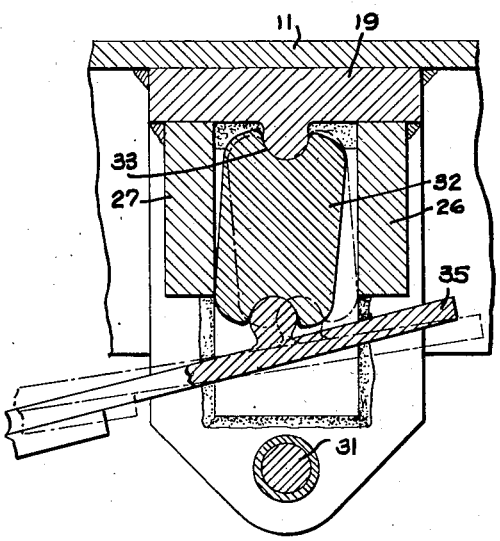
Fig. 6 is a view similar to Fig. 5, but showing the parts in a different operating position.
Figure 7:
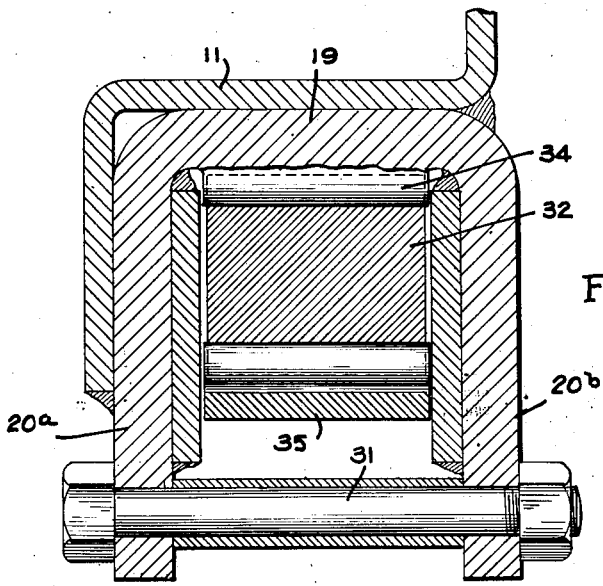
Fig. 7 is a sectional view taken on the line 7—7 of Fig. 5.

Another embodiment of the invention is illustrated in Figs. 5 to 7. In this embodiment relative movement between a free spring end and the frame is achieved as in the embodiment already described through an intermediate rocking member but in the present embodiment the movably contacting or bearing surfaces of spring bracket and rocking member are somewhat modified in contour.

Referring therefore to Figs. 5 to 7, mutually interfitting means are provided on spring and frame for permitting the rocking member 32 to move in limited rolling or pivotal fashion with respect to spring and frame, so as to permit fore and aft reciprocation of the spring end. In the embodiment shown, member 32 of gray cast iron is provided on its top surface with a concave, semi-cylindrical depression 33, and bracket base 19 carries a downwardly extending projection 34 of complementary contour which nests in said depression, whereby to permit the rocking member 32 to oscillate around said projection as a pivot.

The lower surface of block 32 is similarly pivotally arranged with respect to spring leaf 35 by the use of a similar nesting connection. The whole arrangement permits reciprocation of the spring end 35 in relation to the frame within an operating range but the mating interlock at top and bottom of the block prevents accidental slippage or displacement of the block beyond or out of the operating range.

Fig. 6 shows in full line the position of spring and loading block produced by movement of the spring end to the left of the drawing, and the drawing further shows, in dotted line, the effect of movement of the spring end towards the right in the drawing.

Figure 8:
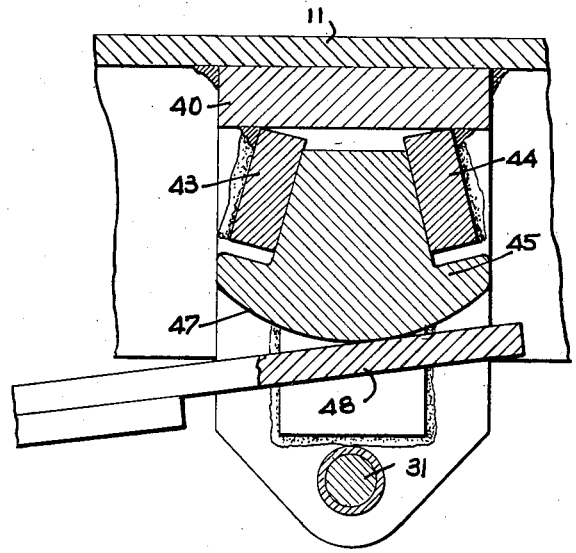
Fig. 8 is a view similar to Figs. 3 and 4, but showing yet another embodiment of the invention.
Figure 9:
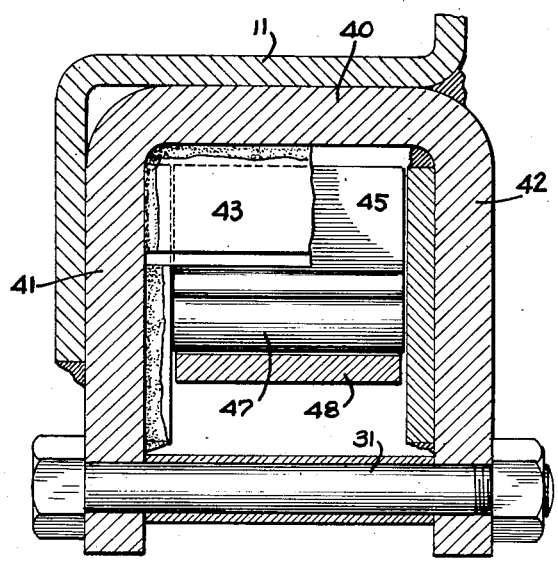
Fig. 9 is a view partly in end elevation, partly in section, of the seating and retaining housing, and also the removable bearing block, shown in Fig. 8.

Figs. 8 and 9 show yet another embodiment of a readily removable bearing block, the present embodiment being normally stationary in service. As in previously described embodiments, a bracket of reversed U-shape is affixed to a vehicle frame 11, the bracket having legs 41 and 42 depending from a base 40. Fixed with respect to said base, and situated between said legs 41 and 42 are two spaced wall members 43 and 44 spanning the upper portion of the space between said legs. Walls 43 and 44 diverge in a downward direction, as seen in Fig. 8.

A bearing block 45 has a wedge-tapered stem 46 which is disposed to seat snugly between walls 43 and 44. The block has a curved bearing surface 47 which is maintained in operative contact with the upper surface of the free end of a leaf spring 48, the block being held in its seat by the spring upthrust resulting from spring loading. The free end of the spring maintains a sliding contact with the bearing face of the loading block. While with this embodiment the wear on the bearing face of block 45 may be expected to exceed that encountered with the loading blocks of the previously described embodiments, the block is readily removable, as were the said other loading blocks.

What I claim is:

In leaf spring suspension means interposed between an axle and frame of a vehicle, and wherein a free end of a leaf spring is reciprocably movable with respect to a fixed point on said frame, said reciprocating movement being responsive to spring flexure resulting from fluctuations in load application, novel spring loading means comprising, in combination, a bearing surface on said leaf spring near said free end thereof, an inverted U-shaped bracket fixed on said frame and having a pair of spaced legs extending downwardly and straddling said free end of said spring, seating means consisting of a pair of spaced seating blocks extending transversely between said legs, and fixed with respect thereto, and having downwardly divergent inner wall portions to form a wedge-like seat, a loading block having a wedge-like stem portion nestable in said seat, and having a bearing portion in sliding contact with said bearing surface on said spring, said loading block being held in position by spring thrust resulting from loading flexure of said spring, but said loading block being adapted to drop by gravity from its said seat when said loading flexure is relieved.

JOSEPH H. DE FREES.

REFERENCES CITED

The following references are of record in the file of this patent:

UNITED STATES PATENTS

| Number | Name | Date |
| --- | --- | --- |
| 748,512 | Lindstrom | Dec. 29, 1903 |
| 804,341 | Plumb | Nov. 14, 1905 |
| 1,478,123 | Hurt | Dec. 18, 1923 |
| 1,480,624 | Lovejoy | Jan. 15, 1924 |
| 1,586,164 | Tait | May 25, 1926 |
| 1,605,363 | Masury et al. | Nov. 2, 1926 |
| 1,617,031 | Schacht | Feb. 8, 1927 |
| 1,921,665 | Fisher | Aug. 8, 1933 |
| 1,935,957 | Searles | Nov. 21, 1933 |
| 1,967,027 | Hebner | July 17, 1934 |
| 2,127,077 | Yates | Aug. 16, 1938 |
| 2,337,073 | Townsend | Dec. 21, 1943 |

FOREIGN PATENTS

| Number | Country | Date |
| --- | --- | --- |
| 546,193 | Germany | Mar. 15, 1932 |
| 747,245 | France | Mar. 28, 1933 |

Certificate of Correction

Patent No. 2,469,158.  May 3, 1949.

JOSEPH H. DE FREES

It is hereby certified that errors appear in the printed specification of the above numbered patent requiring correction as follows:

Column 2, line 17, for "Figs. 3 and 4" read *Figs. 3 and 5*; column 3, line 57, for the numeral "28", second occurrence, read *29*;

and that the said Letters Patent should be read with these corrections therein that the same may conform to the record of the case in the Patent Office.

Signed and sealed this 4th day of October, A. D. 1949.

[SEAL]

THOMAS F. MURPHY,
*Assistant Commissioner of Patents.*